United States Patent
Pitman et al.

(10) Patent No.: US 7,085,613 B2
(45) Date of Patent: *Aug. 1, 2006

(54) SYSTEM FOR MONITORING AUDIO CONTENT IN A VIDEO BROADCAST

(75) Inventors: Michael C. Pitman, Newburgh, NY (US); Blake G. Fitch, White Plains, NY (US); Steven Abrams, New City, NY (US); Robert S. Germain, Larchmont, NY (US)

(73) Assignee: International Business Machines Corporation, Armonk, NY (US)

( * ) Notice: Subject to any disclaimer, the term of this patent is extended or adjusted under 35 U.S.C. 154(b) by 890 days.

This patent is subject to a terminal disclaimer.

(21) Appl. No.: 09/895,822

(22) Filed: Jun. 29, 2001

(65) Prior Publication Data

US 2002/0082731 A1    Jun. 27, 2002

Related U.S. Application Data

(63) Continuation-in-part of application No. 09/803,298, filed on Mar. 9, 2001, now Pat. No. 6,604,072.

(60) Provisional application No. 60/245,799, filed on Nov. 3, 2000.

(51) Int. Cl.
*G06F 17/00* (2006.01)
*G06F 17/17* (2006.01)
*G01R 23/16* (2006.01)
*H04H 9/00* (2006.01)
*G06G 7/00* (2006.01)

(52) U.S. Cl. .............. 700/94; 702/73; 702/77; 725/22; 705/400

(58) Field of Classification Search .......... 700/94; 704/236, 231, 270; 725/22; 702/73; 348/515
See application file for complete search history.

(56) References Cited

U.S. PATENT DOCUMENTS

| | | | | |
|---|---|---|---|---|
| 5,276,629 | A | * | 1/1994 | Reynolds ............ 702/71 |
| 5,504,518 | A | | 4/1996 | Ellis et al. |
| 6,041,316 | A | * | 3/2000 | Allen ............... 705/52 |
| 6,282,653 | B1 | * | 8/2001 | Berstis et al. ...... 713/200 |
| 6,574,594 | B1 | * | 6/2003 | Pitman et al. ...... 704/236 |

(Continued)

OTHER PUBLICATIONS

"13.4 Power Spectrum Estimation Using the FFT," Numerical Recepies in C. Cambridge University Press, 1993, pp. 549-558.

(Continued)

*Primary Examiner*—Sinh Tran
*Assistant Examiner*—Daniel R. Sellers
(74) *Attorney, Agent, or Firm*—Casey P. August; Stephen Bongini; Fleit, Kain, Gibbons, Gutman, Bongini & Bianco P.L.

(57) ABSTRACT

A method is provided for monitoring audio content in a video broadcast. According to the method, an audio datastream from the video broadcast is received, and audio identifying information is generated for audio content from the audio datastream. It is determined whether the audio identifying information generated for the received audio content matches audio identifying information in an audio content database. In one preferred embodiment, the audio identifying information is an audio feature signature that is based on audio content. Also provided is a system for monitoring audio content in a video broadcast.

30 Claims, 9 Drawing Sheets

U.S. PATENT DOCUMENTS

| | | | |
|---|---|---|---|
| 6,657,117 B1 * | 12/2003 | Weare et al. | 84/668 |
| 6,662,231 B1 * | 12/2003 | Drosset et al. | 709/229 |
| 6,748,360 B1 * | 6/2004 | Pitman et al. | 704/270 |
| 2002/0082837 A1 * | 6/2002 | Pitman et al. | 704/270.1 |
| 2003/0023421 A1 * | 1/2003 | Finn et al. | 704/1 |

OTHER PUBLICATIONS

Sundberg, J., "The Science of Musical Sounds," Academic Press, 1991, p. 89.

Germain, R., Califano, Andrea, Colville, S., et al. "Fingerprint Matching Using Transformation Parameter Clustering," IEEE Computational Science and Engineering, Oct.-Dec. 1997, vol. 4, No. 4, pp. 42-49.

Crawford, T., Iliopoulos, C.S., Raman, Rajeev, "String-Matching Techniques for Musical Similarity and Melodic Recognition," Computing in Musicology 11, 1997-1998, pp. 73-100.

* cited by examiner

SYSTEM FOR MONITORING AUDIO CONTENT IN A VIDEO BROADCAST

CROSS-REFERENCE TO RELATED APPLICATIONS

This application is a continuation-in-part of prior U.S. application Ser. No. 09/803,298, filed Mar. 9, 2001 now U.S. Pat. No. 6,604,072, which is based upon and claims priority from prior U.S. Provisional Application No. 60/245,799, filed Nov. 3, 2000. The entire disclosures of application Ser. No. 09/803,298 and Provisional Application No. 60/245,799 are herein incorporated by reference.

BACKGROUND OF THE INVENTION

1. Field of the Invention

The present invention relates to the monitoring of audio content, and more specifically to systems and methods for monitoring the audio channel of a video broadcast and automatically generating audio content information.

2. Description of Related Art

Copyrighted audio content such as music is frequently used in video broadcasts. For example, the video broadcast of a typical television show has music being played before and after commercial breaks and in the background during the show. When a copyrighted song is used during such a video broadcast, the copyright holder is entitled to a royalty whose amount is based on the exact amount of time that the song is actually broadcast. However, this amount of time (and thus the royalty due) is often not known until the show is actually broadcast.

Currently, a manual review of each video broadcast is required to determine the songs that are played and the duration of each song so that the royalties due to the copyright holders can be calculated. This manual accounting process requires labor and is greatly prone to error because of the dependency on human perception and accuracy. Thus, royalty calculations are performed inefficiently and royalty payments are frequently incorrect. For efficient and accurate royalty calculations, there is a need for a reliable system and method for monitoring the audio channel of a video broadcast and automatically generating audio content information that can be used to make royalty calculations.

One difficulty in developing a practical system for automatically monitoring the audio channel of a video broadcast is providing a mechanism for automatically identifying audio content. One solution that has been proposed is to tag copyrighted music by using digital watermarking technology. Another solution is to identify the audio content itself However, the identification of music from any source is not a trivial problem. Different encoding schemes will yield a different bit stream for the same song. Even if the same encoding scheme is used to encode the same song (i.e., sound recording) and create two digital audio files, the files will not necessarily match at the bit level.

Various effects can lead to differentiation of the bit stream even though the resulting sound differences as judged by human perception are negligible. These effects include: subtle differences in the overall frequency response of the recording system, digital to analog conversion effects, acoustic environmental effects such as reverb, and slight differences in the recording start time. Further, the bit stream that results from a recording will vary depending on the type of audio source. For example, the bitstream for a song created by encoding the output of one stereo receiver will generally not match the bitstream for the same song created by encoding the output of another stereo receiver.

In addition, there are forms of noise and distortion that are quite audible to humans, but that do not impede our ability to recognize music. FM broadcasts and audio cassettes both have a lower bandwidth than CD recordings, but are still copied and enjoyed by some listeners. Likewise, many of the MP3 files on the Internet are of relatively low quality, but still proliferate and thus pose a threat to the profitability of the music industry. Furthermore, some intentional evasions of copyright protections schemes involve the intentional alteration or distortion of the music. These distortions include time-stretching and time-compressing. In such cases, not only may the start and stop times be different, but the song durations maybe different as well. All such differences may be barely noticeable to humans, but can foil many conventional copyright protection schemes.

There is a need for systems and methods for automatically calculating royalties for audio content such as sound recordings that are part of a video broadcast, such as by automatically and effectively identifying copyrighted audio content and the amount of time that it is actually broadcast.

DETAILED DESCRIPTION OF PREFERRED EMBODIMENTS

Objects, features, and advantages of the present invention will become apparent from the following detailed description. It should be understood, however, that the detailed description and specific examples, while indicating preferred embodiments of the present invention, are given byway of illustration only and various modifications may naturally be performed without deviating from the present invention.

The following description is directed to the monitoring of a video broadcast such as a television show. However, this is for illustrative purposes only and the present invention is not so limited. The present invention can similarly be applied to any other type of multimedia object (including recorded videos, films, and CD-ROMs), because the source of the audio channel is unimportant to the monitoring function performed in accordance with the present invention.

Figure 1:
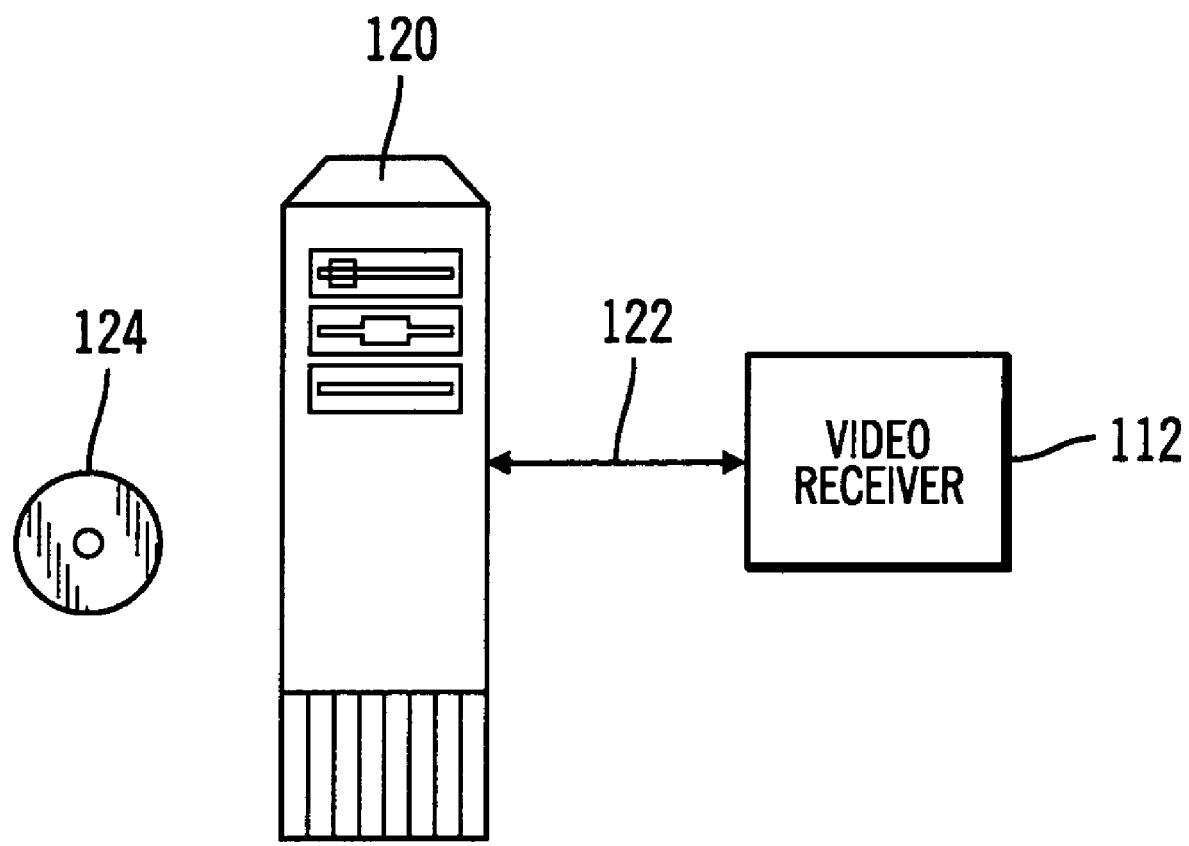
FIG. 1 is a schematic of an exemplary system on which a preferred embodiment of the present invention can be implemented.

FIG. 1 is a schematic of an exemplary system 100 on which the present invention can be implemented. The system includes a video receiver 112 for reproducing at least the audio channel of a video broadcast. A royalty calculation computer (RCC) 120 is communicatively coupled to the video receiver 112 through a data link 122. A computer readable memory medium 124 such as a CD-ROM is provided for loading software onto the RCC for carrying out methods such as those described in detail below. For example, the software can operate to monitor the audio channel of a video broadcast and automatically generate audio content information.

The video receiver can be any conventional reproduction device that is capable of outputting the audio channel of a video broadcast. The RCC can be any conventional computer system such as an IBM PC-compatible computer. As is known, an IBM PC-compatible computer can include a microprocessor, basic input/output system read-only memory (BIOS ROM), random access memory (RAM), hard disk drive storage, removable computer readable medium storage (e.g., a CD-ROM drive), a video display adapter card, a video monitor, a network interface (e.g., modem), a keyboard, a pointing device (e.g., mouse), a sound card, and speakers. The RCC is loaded with an operating system (such as Windows or UNIX) and an RCC application, such as one that operates as described below.

Figure 2:
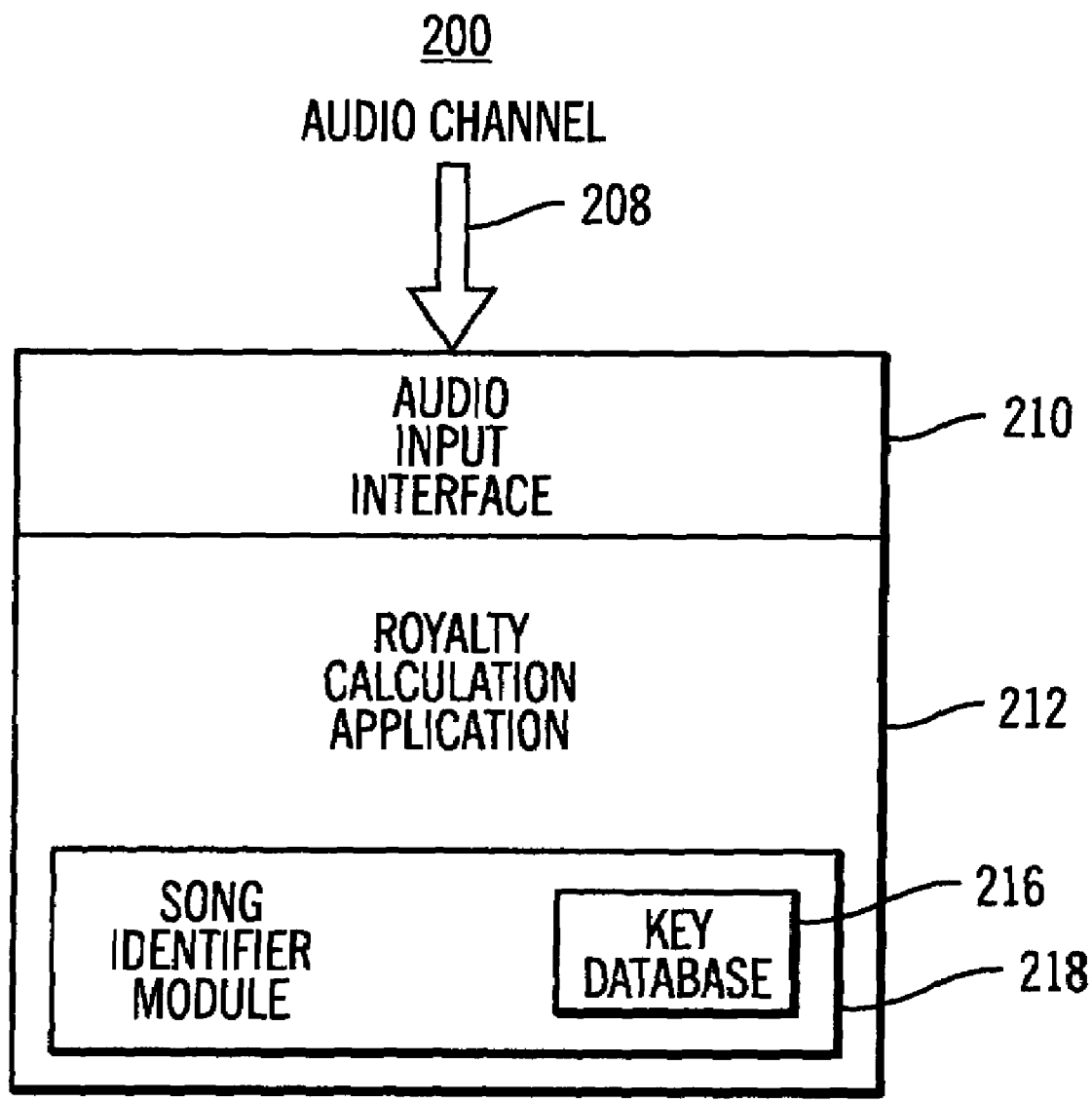
FIG. 2 is a block diagram of a system for monitoring the audio channel of a video broadcast and generating audio content information according to a preferred embodiment of the present invention.

FIG. 2 is a block diagram of software for automatically calculating royalties according to a preferred embodiment of the present invention. An audio channel is coupled through communication link 208 to an audio input interface 210. The audio channel can be derived from any source such as directly from a video broadcast (over the airwaves or through a cable or satellite network) or through a receiver for reproducing the audio channel of a broadcasted or recorded video signal. The audio input interface receives the audio channel input and outputs an audio datastream in the same or a different format (e.g., digital data in MIDI, WAV, or MP3 format) for use by a royalty calculation application 212.

The royalty calculation application includes a content identifier module 216. The content identifier module 216 receives the audio datastream from the audio input interface 210 and decodes it to obtain information. In preferred embodiments, the content identifier module includes a key database that contains numerous keys derived from numerous songs. For each song (i.e., sound recording unit) in the database, there is a set of keys. The set of keys provides a means of identifying a song or a segment of a song. A section of a song will have a corresponding subset of keys that allow the section to be identified, thus retaining the ability to identify the presence of only a segment of a song.

In one exemplary embodiment, the key database takes the form of a key table. Each row of the key table includes a key sequence in a first column, a time group value in a second column, and a song ID (e.g., title) in a third column. The key database is constructed by applying a key generation program to known songs, and associating each key obtained by the key generation program with the title in the key database. The time group is a time (measured in units of a predetermined interval relative to the start of the song) at which an audio feature from which a key is derived occurred. Each time group includes events (explained further below) that occurred during a period of time equal to the predetermined interval. Two different broadcasts of the same song can have slightly different start times (e.g., the broadcast may start a few seconds before or after the actual beginning of the song) or can include only different segments of the song. Such variances present a difficulty that preferred audio identification methods surmount.

Figure 3:
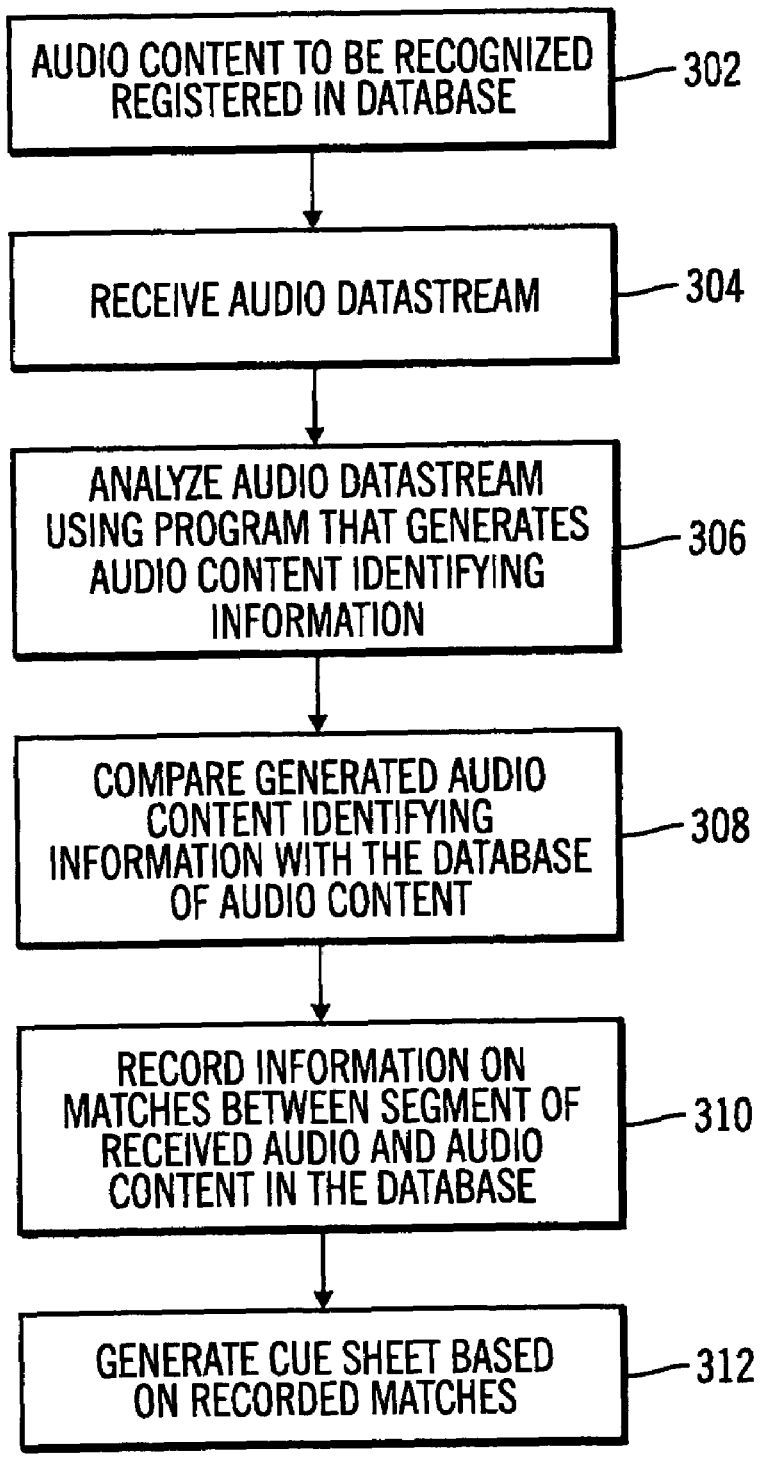
FIG. 3 is a flow diagram of a process for monitoring the audio channel of a video broadcast and generating audio content information according to a preferred embodiment of the present invention.

FIG. 3 is a flow diagram of a process 300 that is performed by the royalty calculation application to automatically identify audio content in the audio channel of a video or multimedia datastream and generate audio content information according to a preferred embodiment of the present invention. In step 302, the audio content to be searched for (e.g., copyrighted sound recordings) is registered along with identifying information in an audio content database. In preferred embodiments, the identifying information is produced by a feature generation system and is based on the audio content itself. For example, the process described in detail below can be used to generate a unique signature (in the form of a set of keys) for each segment of a piece of audio content that is to be searched for.

In further embodiments, the identifying information can be any other type of audio signature or audio fingerprint that is computed based on the audio data itself, an identifying watermark, embedded identification information such as an identification number, or any other type of information that allows individual pieces of audio content or segments of audio content to be uniquely (or substantially uniquely) identified. Further, the audio content to be searched for can be a single selection or multiple selections (e.g., all selections from a copyright holder).

In step 304, an audio datastream is received. Next, in step 306, the content identifier module 218 analyzes the audio datastream that was received in step 304 using an algorithm that generates audio content identifying information like the identifying information stored in the audio content database. For example, in preferred embodiments, unique feature signatures (each in the form of a set of keys) are generated in real time based on the audio content that is received.

In step 308, the generated unique feature signature (audio content identifying information) for each segment of received audio content is compared with the information stored in the audio content database. The content identifier module 218 determines whether or not each segment of received audio content matches any of the audio content registered in the audio content database. For example, a best match algorithm employing some minimum threshold can be used to make such a determination. One exemplary match determination algorithm is discussed in detail below.

In step 310, there is recorded information (e.g., identification of the audio content and time of broadcast) for each detected match of sufficient strength between a segment of received audio content and audio content in the database. In step 312, the recorded match information is used to automatically generate cue sheet entries for the video broadcast. The cue sheet entries detail the start time in the broadcast, the duration, and the identity (e.g., title) of the audio content of interest that is contained in the video broadcast. The cue sheet entries can then be recorded and/or transmitted to a third party (e.g., a copyright holder).

Thus, a cue sheet identifying copyrighted audio content of interest and the duration of each such piece of audio content in one of more video broadcasts can be automatically generated. For example, a licensing organization or individual copyright holder can use the system of the present invention to automatically generate such cue sheets relating to its own copyrighted audio content in one or more video broadcasts, and then charge royalties based on the cue sheet information. Similarly, an information service can use the system of the present invention to automatically generate such a cue sheet that relates to audio content of interest to (e.g., owned by) a third party, and then charge a fee to the third party for the cue sheet. Such cue sheets can also be used as evidence in judicial or administrative proceedings for copyright enforcement.

Additionally, a cue sheet identifying all of the copyrighted audio content in a particular video broadcast can be automatically generated for use in royalty calculations. The broadcaster can then pay royalties based on the cue sheet information for the use of the copyrighted content. For example, the generated cue sheet can be used to automatically: determine what audio content is broadcast and its duration, generate a bill based on the audio content that is found to have been broadcast, and determine how the royalties should be split by third parties (e.g., individual copyright holders).

As an alternative to being used for automatic royalty billing, an automatically generated cue sheet can be used to greatly increase the efficiency of a manual reviewer. More specifically, a manual reviewer currently has to watch the entire video broadcast in order to determine each time copyrighted audio content appears in the broadcast. This is very inefficient for video broadcasts in which music is sporadic and infrequent. With the present invention, the manual reviewer can use the automatically generated cue sheet as a guide to determine the (at least approximate) times that audio content appears in the video broadcast.

Thus, the manual reviewer can use a recorded version of the video broadcast and zoom to (i.e., only watch) the portions that are in the vicinity of the times that the cue sheet lists as containing audio content. In some cases, such manual review may be more desirable than directly using the automatically generated cue sheet to determine royalties (e.g., for auditing the automatic royalty calculations, or in situations such as live broadcasts in which there is frequently talking or applause over part of the music such that it is difficult or requires human judgment to determine the actual start and stop times of the music when it maybe drowned out). Thus, even if a human determination is desired, the present invention is a useful tool that makes the manual review process much more efficient. Further, in some embodiments, the system of the present invention also saves the actual audio segments that are determined to contain the audio content of interest to a database. This allows for even easier auditing or manual review of the automatic royalty calculations made by the system.

Figure 4A:
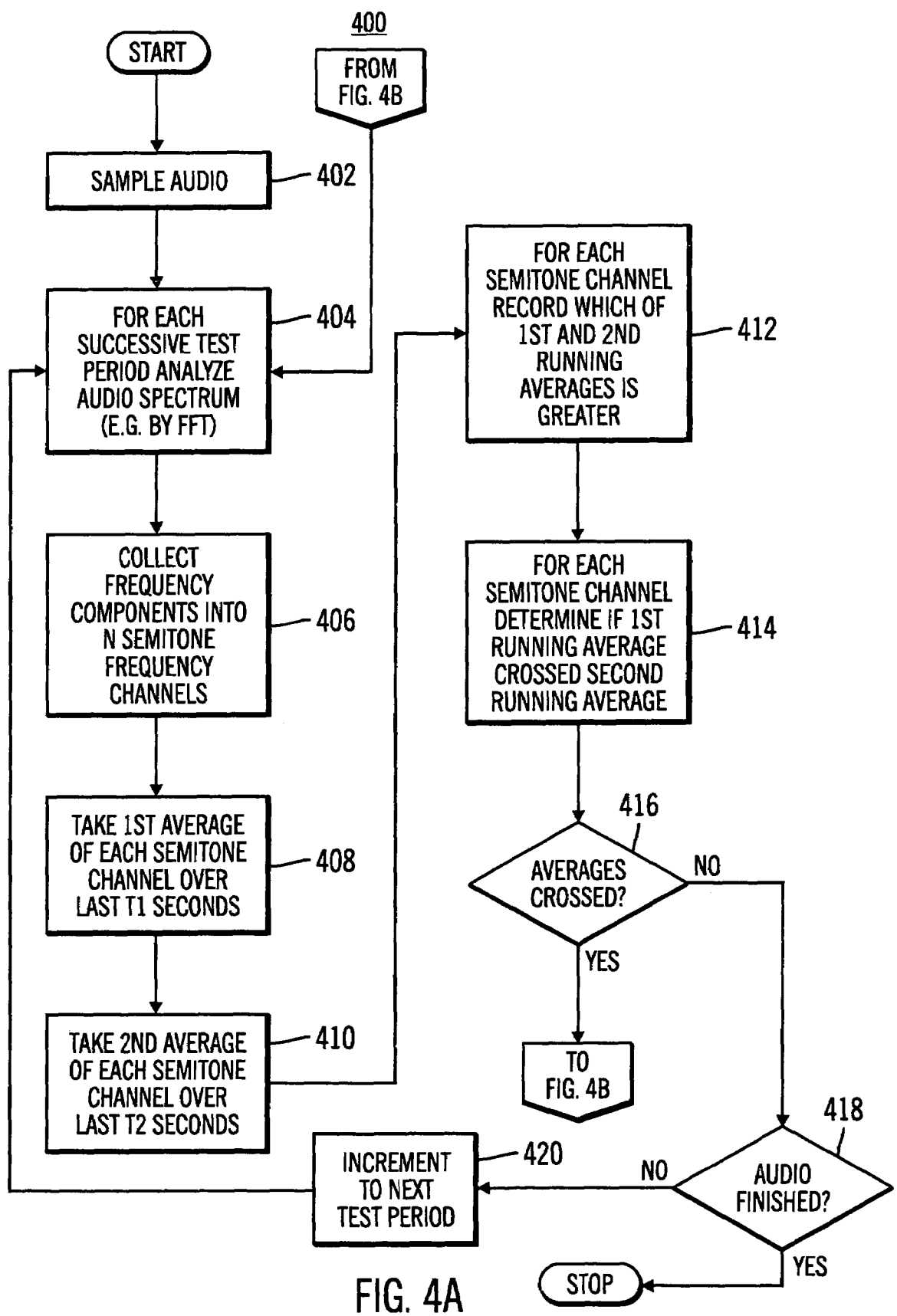
FIGS. 4A and 4B are a flow diagram of a process for identifying events from an audio segment in an exemplary embodiment of the present invention.

FIGS. 4A through 8 illustrate in detail relevant portions of one exemplary process for identifying audio content. FIG. 4A is a first part of a flow diagram of a process 400 for generating an event stream for an audio segment (e.g., song) according to a preferred embodiment of the present invention. The process 400 accepts an audio signal as input and outputs a sequence of "events". In some embodiments of the present invention, the audio signal is reproduced from an MP3 file. In step 402, an audio signal is sampled. In one embodiment, the audio signal is sampled at about 22050 Hz or lower. This allows frequency components up to 11 KHz to be accurately determined. It is advantageous to use an upper frequency limit of about 11 KHz because 11 KHz is about the frequency cutoff for FM broadcast radio, and it is desirable to be able to generate the same set of keys for a song regardless of whether the song recording was at one point transmitted through FM radio or obtained directly from a high quality source (e.g., a CD).

In step 404, for each successive test period the spectrum of the audio signal is computed. The duration of the test period preferably ranges from about $1/43$ of a second to about $1/10.75$ of a second, and more preferably the test period is about $1/21.5$ of a second. The spectrum of the audio signal is preferably analyzed using a fast Fourier transform (FFT) algorithm. The accuracy of spectrum information obtained using an FFT algorithm can be improved by averaging together the results obtained by applying the FFT to several successive periods (sample sets). In preferred embodiments of the present invention, spectrum information is improved by averaging together the results obtained by applying the FFT to two or more successive periods, and preferably 3 or more successive periods, and even more preferably 4 successive periods. According to one exemplary embodiment of the present invention, the spectrum associated with a given test period having a duration of $1/21.5$ of a second is obtained by sampling an audio signal at a rate of 22050 Hz and averaging together the results obtained by applying an FFT algorithm to four successive periods, each of which has a duration of $2/21.5$ seconds and includes 2048 samples.

Step 404 can be accomplished by using an FFT algorithm run on the microprocessor of the RCC 120. Alternatively, the RCC could be provided with FFT hardware for performing step 404. Other spectrum analyzers, such as a filter bank, can alternatively be used for carrying out step 404. Additionally, in process 404, successive sets of samples can alternatively be projected onto another type of basis besides a Fourier basis. One particular alternative to the Fourier basis is a wavelet basis. Like Fourier basis functions, wavelets are also localized in the frequency domain (although to a lesser degree). Wavelets have the added property that they are localized in the time domain as well. This opens up the possibility of projecting the audio signal as a whole, rather than successive sample sets of the audio signal onto a wavelet basis, and obtaining time dependent frequency information about the signal.

One common set of frequencies used in composing music are the notes of the even-tempered scale. The even tempered scale includes notes that are equally spaced on a logarithmic scale. Each note covers a frequency band called a "semitone". The inventors have determined that improved signatures can be obtained by collecting spectral power in discrete semitone bands as opposed to the evenly spaced frequency bands output by an FFT algorithm. In step 406, the spectrum information (e.g., Fourier frequency components) obtained in step 404 are collected into a number of semitone frequency bands or channels.

In step 408, a first average of the power in each semitone frequency channel is taken over the last T1 seconds. In step 410, a second average of the power in each semitone frequency channel is taken over the last T2 seconds, where T2 is greater than T1. T1 is preferably from about $1/10$ to about 1 second. T2 is preferably larger than T1 by a factor of from 2 to 8. According to a one exemplary embodiment of the present invention, T2 is equal to one second, and T1 is equal to one-quarter of a second. The "events" mentioned above occur when the value of the first average crosses the second average.

In step 412, the values of the first and second averages are recorded for each semitone channel. Recording is done so that it can be determined during the following test period whether the first average crossed the second average. In step 414, for each semitone channel it is determined if the first average crossed the second average. This is done by comparing the inequality relation between the first and second averages during the current test period to the inequality relation for the last period. Although comparison between only two averages has been discussed above, it is possible according to alternative embodiments of the present invention to use more than two averages, and identify events as the crossing points between different sub-combinations of the more than two averages.

In the vicinity of an extremum (local maximum or minimum) in a semitone frequency channel, the two averages will cross. Rather than looking for the crossing point of two running averages with different averaging periods, another type of peak detector (e.g., an electronic circuit) could be used. Such could advantageously be used in combination with an FFT in an implementation of the present invention that is implemented predominately in hardware, as opposed to software.

Rather than looking for a peak in the signal in a frequency channel, another type of curve characteristic such as an inflection point could be used as a trigger event. An inflection point can be found by calculating a second derivative of a frequency channel by operating on three successive values of the power in a given frequency channel, and identifying a time at which the second derivative changes from positive to negative or vice versa. The second derivative can be approximated using function (time dependent frequency component) values for three successive points in the following formula.

$$(F(N+2)-F(N+1)+F(N))/\Delta T$$

where F(I) is the value of the function at the $i^{th}$ time (e.g., at the $i^{th}$ test period), and $\Delta T$ is the interval between successive function values (e.g., the duration of the test period).

At an extremum of a time dependent frequency component, its first derivative is equal to zero. At an inflection point of a time dependent frequency component, its second derivative is equal to zero. Extrema and inflection points are both kinds of events. More generally events can be defined as points (i.e., points in time) at which an equation involving a time dependent frequency component derivative of one or more orders of the time dependent frequency components, and/or integrals involving the time dependent frequency components is satisfied. To allow their use in identifying different audio content, an essential part of the definition of "events" is that they occur at a subset of test periods, not at each test period.

Step 416 is a decision block, the outcome of which depends on whether averages for a semitone channel crossed. Step 416 is tested for each semitone channel. If averages for a semitone channel were not crossed during the current test period, then in step 418 it is determined if the audio signal is over. If the audio stream is finished, then the process 400 terminates. If the audio signal is not finished, then the process 400 is advanced to the next test period and the process continues with step 404. If on the other hand, averages did cross during the last test period then the process 400 continues with step 422 in which each event is assigned to the current time group and information related to the average crossing event is generated.

Event information preferably includes the time group for the event, the test period for the event, the semitone frequency band of the event, and the value of the fast average (average over T1) at the time of crossing. Event information can be recorded in a memory or storage device associated with the RCC. Each time group covers a period of time that is longer than a test period, and preferably time groups cover successive periods of time equal to from ¼ to 2 seconds, and more preferably each time group covers a period of from one-half to three-quarters of a second. Grouping events into successive time groups has the advantage that keys obtained by processing two recordings of the same song will tend to match more completely despite the fact that one or both of the recordings may have some distortions (e.g., distortions that arise in the course of recording on magnetic tape).

In step 424, the process 400 is incremented to the next test period. In step 426, it is determined if the audio segment (e.g., song) is finished. If the audio segment is finished then the process 400 terminates. If the audio segment is not finished, then the test period is incremented and the process loops back to step 404.

Thus, the result of the process is to take an audio signal and produce a plurality of events. Each event is assigned to a semitone frequency band in which it occurred and a time group (interval) within which it occurred. The events can be stored in a memory (e.g., RAM in the RCC 120). The events can be stored in a buffer from which they are successively read by one or more key generator processes. The events output by the process could be in the form of an event stream, which is to say that after each time group, all the events occurring within the time group could be written to memory and thereby made available for further processing. An alternative is to write all the events for a song to memory or storage at one time.

Figure 4B:
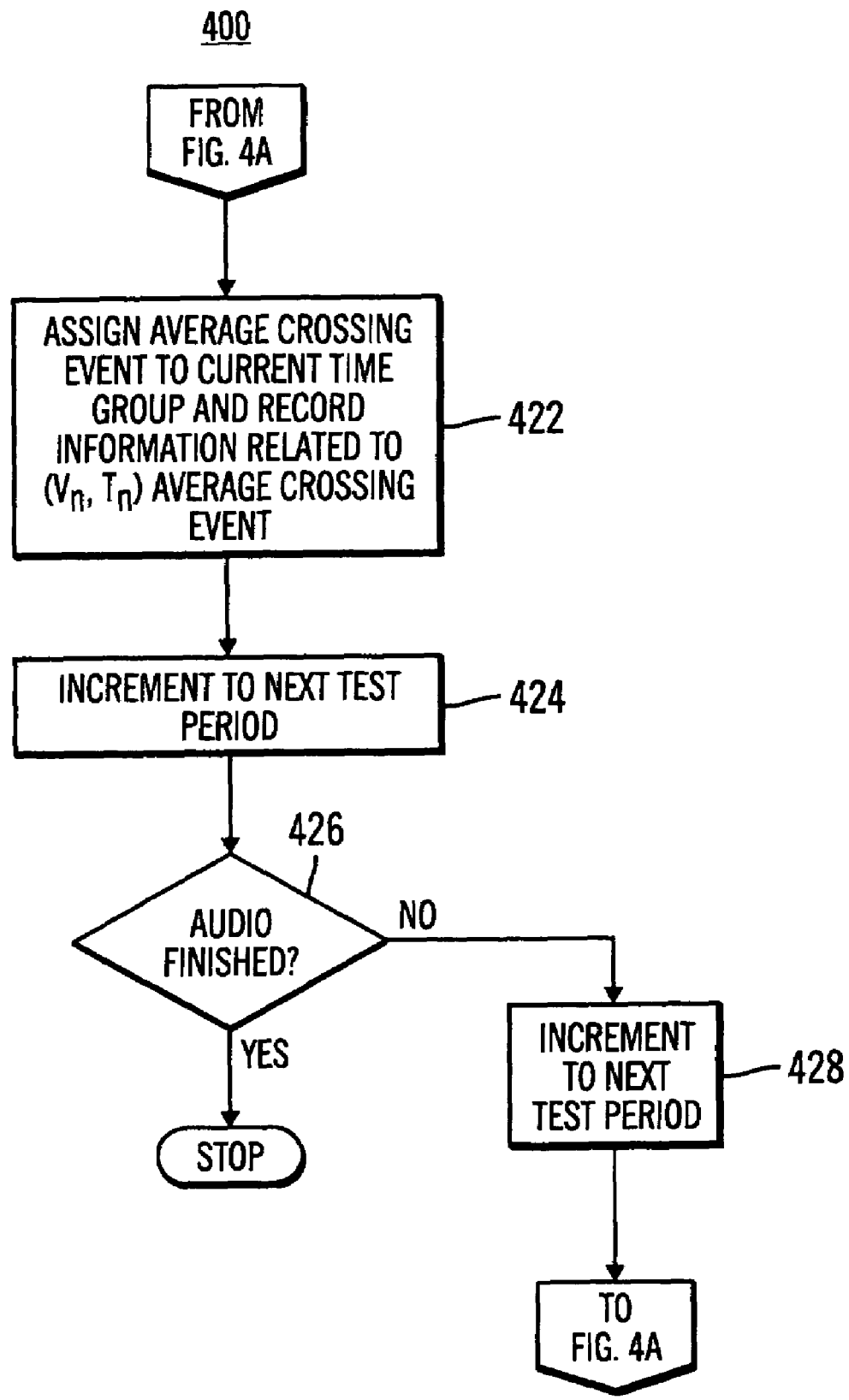
Figure 5:
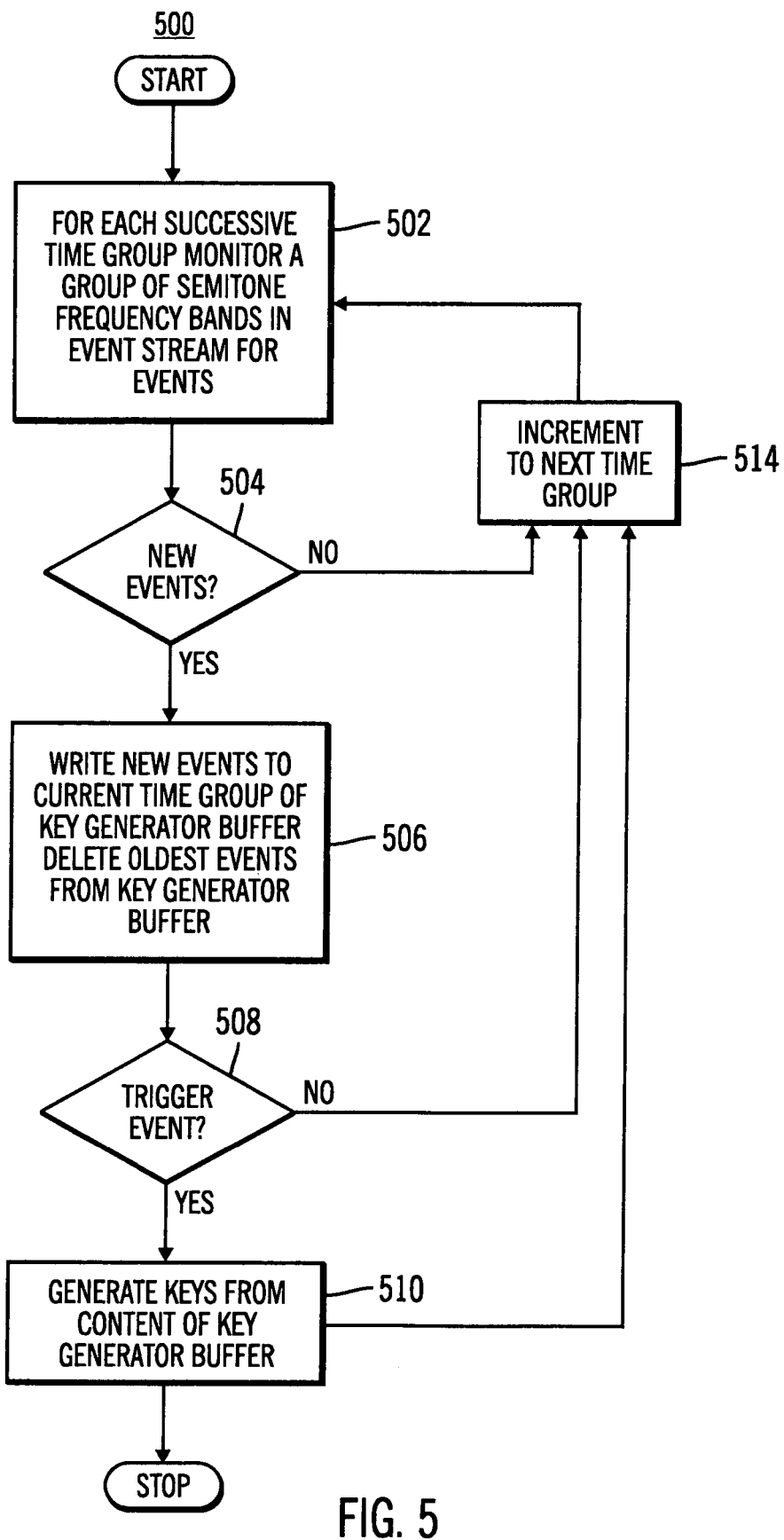
FIG. 5 is a flow diagram of a process for generating keys from the events produced by the process shown in FIGS. 4A and 4B.

FIG. 5 is a flow diagram of a key generator process for generating keys from the events produced by a process such as that shown in FIGS. 4A and 4B. The events output by process 400 are processed by a plurality of key generator processes 500. Each of the plurality of key generator processes is assigned to one semitone frequency band that is designated as its main frequency. However, each key generator also uses events that occur in other semitone frequency bands near its main frequency. Preferably each key generator monitors from 5 to 15 semitone frequency bands. If the number of frequency bands monitored is too few, the resulting keys will not be as strongly characteristic of the particular audio segment. On the other hand, a higher number of frequency bands will result in higher computational expense for computing and comparing keys, greater memory requirements for storing keys, and potential performance loss due to key saturation in the key table from the increased number of keys. According to one embodiment of the present invention, each key generator monitors its main semitone frequency band and four other semitone frequency bands, two on each side of the main semitone frequency band.

Referring now to FIG. 5, in step 502 each successive time group of events output by process 400 is monitored for events occurring within the semitone frequency bands assigned to this key generator. Step 504 is a decision block, the outcome of which depends on whether the key generator detected (e.g., by reading from memory) any new events in step 502. If not, then in step 514, the process 500 is incremented to the next time group and loops back to step 502. If, on the other hand, new events did occur in the time group and semitone frequency bands checked, then in step 506 the new events are written to a key generator buffer for the key generator under consideration, and the events for the oldest time group that were stored in the key generator buffer are deleted. In one exemplary embodiment, the buffer can be seen as an array in which the rows correspond to time groups and the columns to frequency bands. Thus, in the embodiment of the present invention mentioned above, there would be five columns for each of the semitone frequency bands monitored by each key generator.

The key generator buffer preferably includes events from 3 to 7 time groups. More preferably, events from five or six time groups are maintained in each key buffer array. Note that in this embodiment not all time groups are represented in the key generator buffer. As shown in FIG. 5, if no events occur in the semitone frequency bands for a key generator in a certain time group, then no change will be made to the key generator buffer. In other words, a blank row will not be recorded. Therefore, each time group recorded in the key generator buffer includes at least one event.

Step 508 is decision block whose outcome depends on whether an event that occurred in the current time group (e.g., current pass through program loop) is a trigger event. According to a preferred embodiment of the present invention, a trigger event is an event that occurs at the main frequency assigned to this key generator. If a trigger event did not occur, then the process loops back to step 514. If a trigger event did occur, then the process continues with step 510 in which keys are generated from the contents of the key generator buffer. The process 500 continues until all of the events produced by process 400 have been processed.

Figure 6:
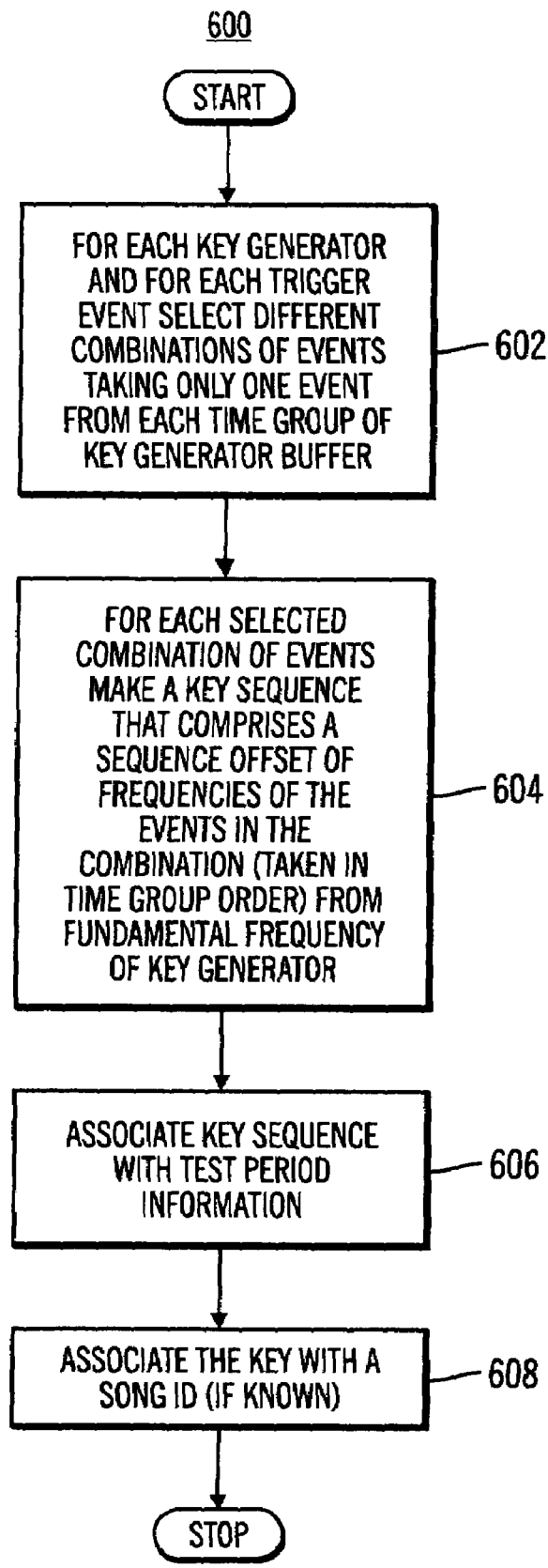
FIG. 6 is a flow diagram of a process for generating keys from the content of a key generator buffer in an exemplary embodiment of the present invention.

FIG. 6 is a flow diagram of a process for generating keys from the contents of a key generator buffer according to one embodiment of the present invention. In particular, the process 600 shows in detail one embodiment of the implementation of step 510 of FIG. 5. In step 602, for each key generator (as explained above there are a plurality of key generators carrying out process 500) and for each trigger event for the key generator under consideration, one or more different combinations of events from the key generator buffer are selected. Each combination includes only one event from each time group. (There maybe more than one event for each time group in each key generator buffer.) According to a preferred embodiment of the present invention, not all possible combinations are selected, rather only combinations for which a power associated with each event changes monotonically from one event to the next in the combination are selected.

In this embodiment, the order of events within a combination corresponds to the time group order. The power associated with each event is preferably the magnitude of the fast (first) average at the test period at which the event occurred. In this embodiment, less than all of the possible combinations of keys will be taken, so that the total number of keys for a given audio segment will tend to be reduced which leads to lower memory and processing power requirements. On the other hand, there will be enough keys that the identity of the song will be well characterized by (i.e., strongly correlated to) the set of keys generated from the song. According to an alternative embodiment, only a single combination is selected from the contents of the key generator buffer. The single combination includes the event associated with the highest fast average power from each time group. According to another alternative embodiment, all the different combinations of events taking one event from each time group are taken.

In step 604, for each selected combination of events a key sequence is composed that includes a sequence of numerical values of frequency offsets (relative to the main key generator frequency) for the sequence of events from each combination formed in step 602. Each frequency offset is the difference between the frequency of the semitone band in which the event occurred and the main frequency of the key generator. In step 606, test period information (e.g., a sequence number for the test period of the trigger event, where the sequence number for the first test period for each song is designated by the number one) for the trigger event is associated with the key sequence.

In step 608, the key which includes the key sequence and the test period information is associated with a song (or other audio) identifier or ID (e.g., title). Process 600 includes step 608 in the case that known songs are being used to construct a song database against which unknown songs will be compared. In comparing two songs, both the key sequence and test period information will be used, as described further below with reference to FIG. 8. The song database can take the form of a table including three columns and a plurality of rows. The first column includes key sequences, the next column includes corresponding test periods associated with the key sequences, and the final column includes an identification of the song from which the keys in the row were obtained.

While the processes described above can be used to identify audio content, it is advantageous to filter percussion events. More specifically, percussion sounds in a song, if not filtered, typically account for high percentage of the events output by process 400. In the interest of saving computer resources (e.g., memory and processing power) and obtaining a more characteristic set of keys, it is desirable to reduce the number of percussion events such as by eliminating some percussion events before events are processed by the key generator process 500. It has been recognized by the inventors that percussion sounds lead to events being triggered during the same test period in adjacent semitone frequency bands. For example, percussion sounds can lead to events occurring in a sequence of 2 or more adjacent semitone frequency bands.

Figure 7:
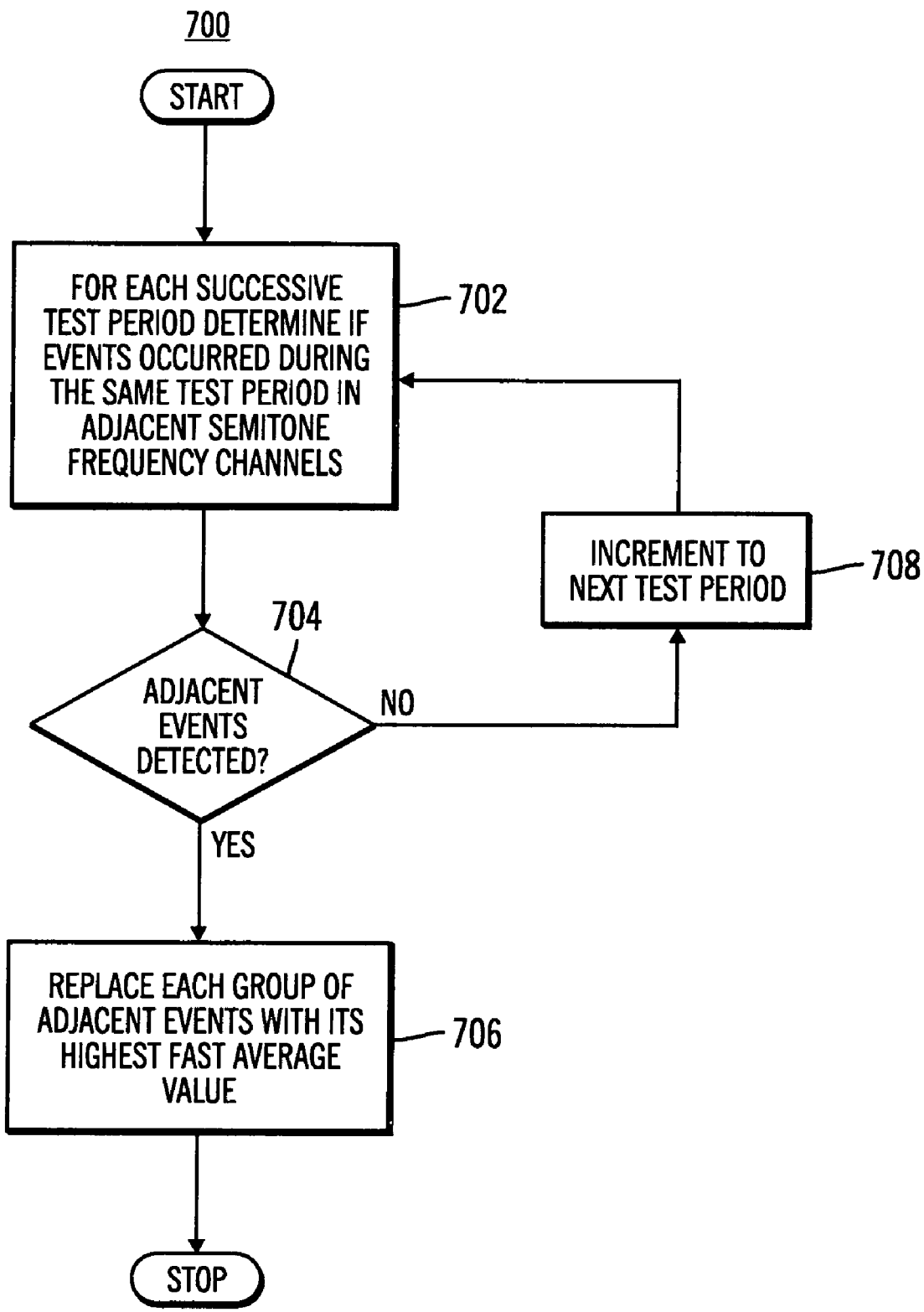
FIG. 7 is a flow diagram of a process for filtering percussion events in an exemplary embodiment of the present invention.

FIG. 7 is a flow diagram of a process used in a preferred embodiment to filter percussion events from the events produced by the process of FIGS. 4A and 4B. In step 702, for each successive test period it is determined if multiple events occurred in a sequence of two or more adjacent semitone frequency bands. Step 704 is a decision block, the outcome of which depends on whether multiple events in adjacent frequency bands occurred. A threshold of some predetermined number of events occurring in adjacent frequency bands used in the process. Preferably, a lower limit on the number of adjacent frequency bands in which events must be found (in order to consider that the events were produced by a percussion sound) is set at three or more. According to an exemplary embodiment of the present invention, events must occur in three successive semitone frequency bands for the outcome of step 704 to be positive.

If the outcome of step 704 is negative, then the process continues with step 708 in which the process increments to the next test period and loops back to step 702. If, on the other hand, the outcome of step 704 is positive, then the process 700 continues with step 706 in which each sequence of events that occurred during the same test period in adjacent frequency bands is pared down to a single event. All of the events except for the event in the sequence that has the highest fast average value are deleted from the event stream produced by process 400. Alternatively, instead of deleting all but one, up to a certain predetermined number of events can be retained.

The processes described above produce keys for a sound recording based on the features (i.e., events) contained in the sound recording. Thus, the processes can be ran on known audio content to construct a feature database of the known audio content during a storage phase. After the database is created, during a retrieval phase the above processes can be used to extract features from unknown audio content and then the database can be accessed to identify the audio content based on the features that are extracted. For example, the same processes can be run on the unknown audio content to extract features in real time (or even faster), and then the audio content is identified with the best match in the database. In one embodiment, a best match can be reported for each predetermined interval (e.g., 10 to 30 seconds) of the audio content.

Figure 8:
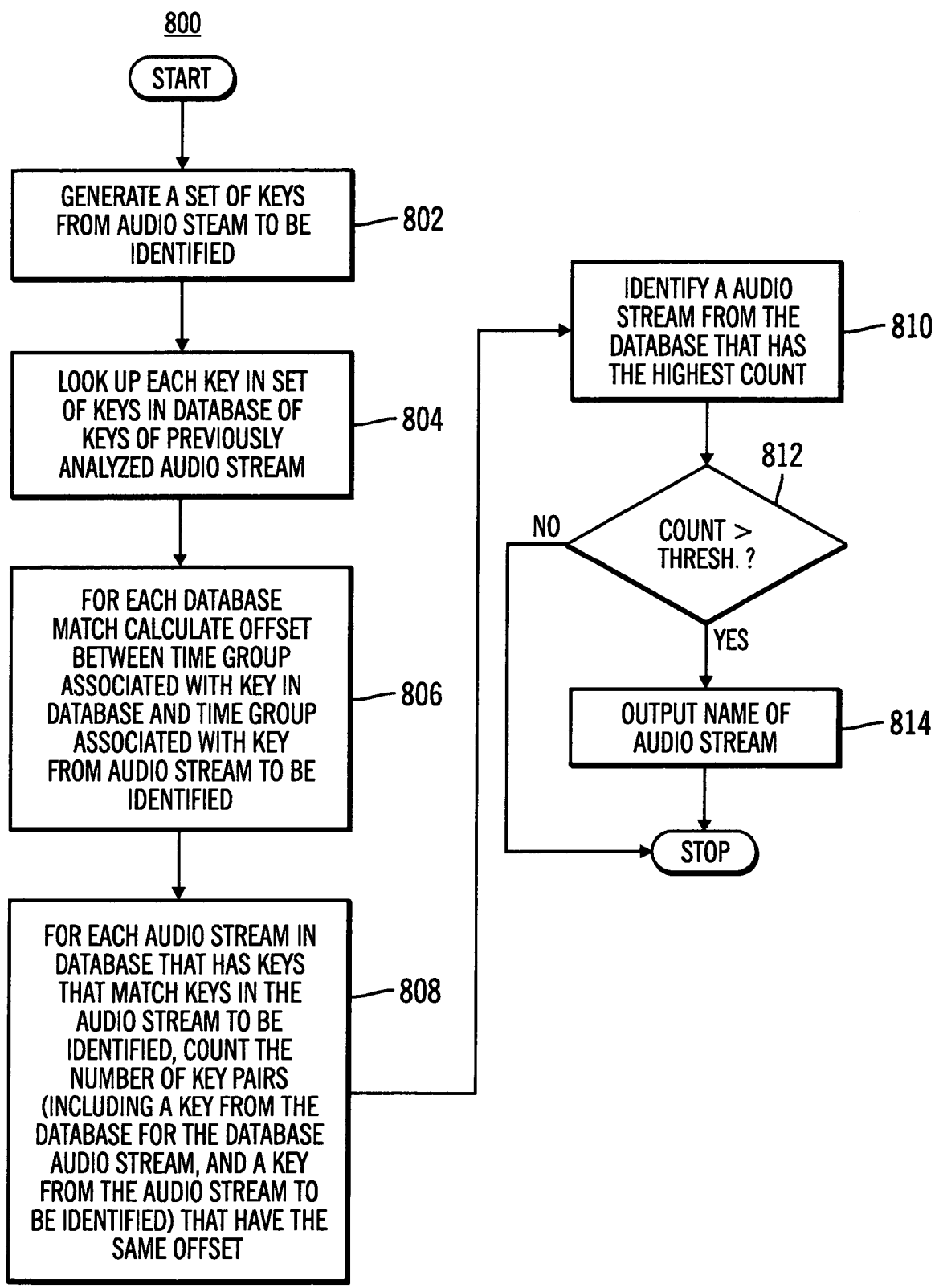
FIG. 8 is a flow diagram of a process for using keys to compare two audio segments in an exemplary embodiment of the present invention.

FIG. 8 is a flow diagram of a song identification process that uses the keys generated in the processes of FIGS. 5 and 6 to identify an audio segments. A song database (such as that described above) is used to identify an unknown song such as a song downloaded from a web site in step 304 of process 300. The key sequence field (column) of the song database can be used as a database key. The records (rows) of the song database are preferably stored in a hash table for direct lookup. The identification process 800 is an exemplary implementation of step 308 of FIG. 3.

In step 802, keys are generated from a song to be identified (for example, by carrying out the processes shown in FIGS. 5 and 6). In step 804, each key in the set of keys generated in step 804 is looked up in a song database that includes keys for a plurality of songs. The key sequence part (as opposed to the test period part) of each key is used as a database key. In other words, the song database is searched for any entries that have the same key sequence as a key sequence belonging to a key obtained from the song to be identified. More than one key in the song database can have the same key sequence, and furthermore by happenstance more than one song in the song database can share the same key sequence. In step 806, for each key in the database that matched (by key sequence) one or more keys in the song database, an offset is calculated by taking the difference between a test period associated with the key being looked up and a test period associated with each matching key in the song database.

In step 808, the offsets are collected into offset time groups. The offset time groups for the offsets are distinct from the time groups used in key generation. According to a preferred embodiment, an offset time group will be equal to from 2 to 10 test periods. Byway of illustration, if each offset time group were 5, then any pair of keys for which the difference determined instep 806 was between 0 and 5 would be assigned to a first offset time group, and any pair of keys for which the difference was between 6 and 10 would be assigned to a second offset time group. According to an exemplary embodiment of the present invention, each offset time group is equal to 5 test periods.

In step 810, for each song that has keys that match keys in the song to be identified, and for each offset time group value that was determined in step 808 and involved keys for a given song in the song database, a count is made of the number of matching keys that had the same time group offset value. One can visualize step 810 in the following way, which may also be used as a basis for an implementation approach. A temporary table is constructed where each row corresponds to a song from the song database that had one or more key matches with the song to be identified. The first column includes names of the songs. In the second column, adjacent each song name there is a value of the offset time group that was found between keys found for the named song in the song database, and matching keys from the song to be identified. After completing step 810, the third column will include counts of the number of key matches corresponding to a particular song identified in the first column, that had the same offset time group as identified in the second column. The table might appear as follows.

TABLE 1

| SONG TITLE | OFFSET VALUE (UNITS OF TIME GROUP INTERVAL) | COUNT OF KEY SEQUENCE MATCHES FOR THIS SONG AND WITH THIS OFFSET VALUE |
| --- | --- | --- |
| Title 1 | 3 | 1 |
| Title 1 | 4 | 1 |
| Title 2 | 2 | 2 |
| Title 2 | 3 | 107 |
| Title 3 | 5 | 1 |
| Title 2 | 8 | 1 |

If the song to be identified is in the database, then one particular time group offset value will accumulate a high count. In other words, a high number of matching pairs of keys will be found to have some particular value of offset time group. In the example above, the song entitled Title 2 has a count of 107 for an offset time group of 3. For example, the time group offset may arise because the specific recording that is being identified started a few seconds after the recording of the song used to generate keys for the song database, or because a small segment of the song is being identified.

In step 812, the song from the song database that has the highest count of matching keys with the same offset is identified. In decision block 814, the count is compared to a threshold value. The threshold can be set based on the particular application or through a determination of the minimum value for the highest counts that are found when songs actually match, and the maximum value of the highest counts when songs tested do not match any songs in the database. The value of the threshold used also depends on the specific embodiment chosen for step 602 discussed above, as this determines the total number of keys.

Rather than comparing the count to a threshold, it is possible instead in step 812 to compare a threshold with the ratio of the highest count to the total number of keys generated from the song to be identified. Another alternative is to compare a threshold with the ratio of the highest count to the average of the remaining counts. These latter two alternatives can also be viewed as comparing the highest count to a threshold, although in these cases the threshold is not fixed. If, as would be the case when the song to be identified is not in the database, the count does not meet the threshold criteria, then the song identification process 800 terminates. Additional steps may be provided for reporting (e.g., to a user) that the song to be identified could not be identified. If on the other hand the count does meet the threshold criteria, then in step 814 information identifying the song that had the highest count (which met the threshold criteria) is output. In further embodiments, the processes of the present invention are used to identify segments of songs.

The process for identifying songs described above with reference to FIGS. 4A through 8 is robust in terms of its ability to handle distortion and alteration. Furthermore, the process is also efficient in terms of computational complexity and memory requirements. The processes for generating an event stream, filtering percussion events, generating keys, and looking up the keys in a song database can also be conducted in real time (or faster). The computational expense of the process is low enough to allow it to run in real time on a common personal computer.

Accordingly, the present invention provides systems and methods for monitoring the audio channel of a video broadcast and automatically generating audio content information that can be used to make royalty calculations. In preferred embodiments, the system detects audio content of interest in a video broadcast, and then generates cue sheets detailing the time of broadcast, duration, and identity of the audio content in the video broadcast. Besides being accurate, the cue sheets can be automatically generated in real time so as to allow billing information to be available immediately. In contrast, the current manual accounting process can introduce a significant lag time between broadcast and availability of the billing information. Thus, the present invention are liable and efficient system for automatically calculating royalties.

Preferably, the system of the present invention operates in real time from an actual video broadcast. This allows the audio datastream that is to be monitored to be fed directly into the application for real-time feature generation of the broadcasted audio content. Alternatively, the system can operate in real time (or even faster) from recorded video or film (e.g., to give knowledge of who must be paid in advance of it being broadcast or performed).

While the embodiments described above relate to a single audio datastream, the system of the present invention could easily be adapted by one of ordinary skill in the art to monitor multiple audio datastreams in parallel. Furthermore, while the embodiments of the present invention described above relate to audio content, the system of the present invention could easily be adapted by one of ordinary skill in the art to monitor any other type of media content for which royalties are charged based on duration. In such further embodiments, a datastream of the desired type is received, identifying information is generated from the broadcast datastream, and then the generated identification information is compared with a database of identifying information for the content of interest.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which includes all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form. Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, disk drive memory, CD-ROM, and other permanent storage. Additionally, a computer medium may include, for example, volatile storage such as RAM, buffers, cache memory, and network circuits. Furthermore, the computer readable medium may include computer readable information in a transitory state medium such as a network link and/or a network interface, including a wired network or a wireless network, that allow a computer to read such computer readable information.

While there has been illustrated and described what are presently considered to be the preferred embodiments of the present invention, it will be understood by those skilled in the art that various other modifications maybe made, and equivalents maybe substituted, without departing from the true scope of the invention. Additionally, many modifications maybe made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method for monitoring audio content in a video broadcast, said method comprising the steps of:
   receiving an audio datastream from the video broadcast;
   generating audio identifying information for audio content from the audio datastream based on detected events in the audio content; and
   determining whether the audio identifying information generated for the received audio content matches audio identifying information in an audio content database,
   wherein the generating step includes the sub-step of:
      detecting a plurality of events in the audio content, each of the events being a crossing of the value of a first running average and the value of a second running average,
      wherein the first running average is an average over a first averaging period of a plurality of time dependent frequency components of the audio content, and
      the second running average is an average over a second averaging period, which is different than the first averaging period, of the time dependent frequency components of the audio content.

2. The method according to claim 1, wherein the audio identifying information is an audio feature signature that is based on the detected events in the audio content.

3. The method according to claim 2, wherein the determining step includes the sub-step of comparing the audio feature signature generated for the received audio content with the audio feature signatures stored in the audio content database.

4. The method according to claim 1, further comprising the steps of:
   generating audio identifying information for predetermined audio content based on detected events in the predetermined audio content; and
   storing the audio identifying information for the predetermined audio content in the audio content database.

5. The method according to claim 1, further comprising the step of:
   if the audio identifying information generated for the received audio content matches audio identifying information in the audio content database, recording information on a match between the received audio content and the audio content database.

6. The method according to claim 5, further comprising the steps of:
   compiling cue sheet entries from the recorded match information, the cue sheet entries including identification of at least one piece of audio content in the video broadcast, a start time of each piece of audio content, and a duration of each piece of audio content; and
   charging royalties based on the cue sheet entries.

7. The method according to claim 5, further comprising the steps of:
  compiling cue sheet entries from the recorded match information, the cue sheet entries including identification of each piece of audio content in the video broadcast, a start time of each piece of audio content, and a duration of each piece of audio content; and
  paying royalties based on the cue sheet entries.

8. The method according to claim 5, further comprising the step of:
  compiling a cue sheet containing cue sheet entries from the recorded match information, the cue sheet entries including identification of at least one piece of audio content in the video broadcast, a start time of each piece of audio content, and a duration of each piece of audio content; and
  charging a fee for the cue sheet.

9. The method according to claim 1, wherein the generating step further includes the sub-steps of:
  obtaining an audio signal characterized by a time dependent power spectrum;
  analyzing the spectrum to obtain the time dependent frequency components;
  producing the audio identifying information for the audio content from the audio datastream based on the detected events.

10. The method according to claim 9, wherein the sub-step of analyzing the spectrum includes:
  sampling the audio signal to obtain a plurality of audio signal samples;
  taking a plurality of subsets from the plurality of audio signal samples; and
  performing a Fourier transform on each of the plurality of subsets to obtain a set of Fourier frequency components.

11. The method according to claim 9, wherein the sub-step of detecting a plurality of events includes:
  keeping the first running average over the first averaging period of the plurality of time dependent frequency components so as to obtain a first series of averages for the first averaging period;
  keeping the second running average over the second averaging period of the plurality of time dependent frequency components so as to obtain a second series of averages for the first averaging period; and
  recording a plurality of event times, each of the event times being a time at which there occurs one of the detected events of the first running average crossing the second running average.

12. The method according to claim 1, wherein the generating step further includes the sub-steps of:
  performing a Fourier transformation of the audio content into a time series of audio power dissipated over a first plurality of frequencies;
  grouping the frequencies into a smaller second plurality of bands that each include a range of neighboring frequencies;
  detecting power dissipation events in each of the bands; and
  grouping together the power dissipation events from mutually adjacent bands at a selected moment so as to form an identifying feature.

13. A method for charging a royalty for usage of copyrighted audio content in a video broadcast, said method comprising the steps of:
  receiving an audio datastream from the video broadcast;
  generating audio identifying information for audio content from the audio datastream based on detected events in the audio content;
  determining whether the audio identifying information generated for the received audio content matches audio identifying information in a copyrighted audio content database; and
  if the audio identifying information generated for the received audio content matches audio identifying information in the copyrighted audio content database, determining a duration of the audio content in the video broadcast and charging a royalty based on the duration,
  wherein the generating step includes the sub-step of:
    detecting a plurality of events in the audio content, each of the events being a crossing of the value of a first running average and the value of a second running average,
    wherein the first running average is an average over a first averaging period of a plurality of time dependent frequency components of the audio content, and the second running average is an average over a second averaging period, which is different than the first averaging period, of the time dependent frequency components of the audio content.

14. A computer-readable medium encoded with a program for monitoring audio content in a video broadcast, said program containing instructions for performing the steps of:
  receiving an audio datastream from the video broadcast;
  generating audio identifying information for audio content from the audio datastream based on detected events in the audio content; and
  determining whether the audio identifying information generated for the received audio content matches audio identifying information in an audio content database,
  wherein the generating step includes the sub-step of:
    detecting a plurality of events in the audio content, each of the events being a crossing of the value of a first running average and the value of a second running average,
    wherein the first running average is an average over a first averaging period of a plurality of time dependent frequency components of the audio content, and the second running average is an average over a second averaging period, which is different than the first averaging period, of the time dependent frequency components of the audio content.

15. The computer-readable medium according to claim 14, wherein the audio identifying information is an audio feature signature that is based on the detected events in the audio content.

16. The computer-readable medium according to claim 15, wherein the determining step includes the sub-step of comparing the audio feature signature generated for the received audio content with the audio feature signatures stored in the audio content database.

17. The computer-readable medium according to claim 14, wherein said program further contains instructions for performing the steps of:
  generating audio identifying information for predetermined audio content based on detected events in the predetermined audio content; and
  storing the audio identifying information for the predetermined audio content in the audio content database.

18. The computer-readable medium according to claim 14, wherein said program further contains instructions for performing the step of:

if the audio identifying information generated for the received audio content matches audio identifying information in the audio content database, determining a duration of the audio content in the video broadcast and charging a royalty based on the duration.

19. The computer-readable medium according to claim 14, wherein said program further contains instructions for performing the steps of:
if the audio identifying information generated for the received audio content matches audio identifying information in the audio content database, recording information on a match between the received audio content and the audio content database;
compiling cue sheet entries from the recorded match information, the cue sheet entries including identification of at least one piece of audio content in the video broadcast, a start time of each piece of audio content, and a duration of each piece of audio content; and
charging royalties based on the cue sheet entries.

20. The computer-readable medium according to claim 14, wherein said program further contains instructions for performing the steps of:
if the audio identifying information generated for the received audio content matches audio identifying information in the audio content database, recording information on a match between the received audio content and the audio content database;
compiling cue sheet entries from the recorded match information, the cue sheet entries including identification of each piece of audio content in the video broadcast, a start time of each piece of audio content, and a duration of each piece of audio content; and
paying royalties based on the cue sheet entries.

21. The computer-readable medium according to claim 14, wherein the generating step further includes the sub-steps of:
obtaining an audio signal characterized by a time dependent power spectrum;
analyzing the spectrum to obtain the time dependent frequency components;
producing the audio identifying information for the audio content from the audio datastream based on the detected events.

22. The computer-readable medium according to claim 21, wherein the sub-step of analyzing the spectrum includes:
sampling the audio signal to obtain a plurality of audio signal samples;
taking a plurality of subsets from the plurality of audio signal samples; and
performing a Fourier transform on each of the plurality of subsets to obtain a set of Fourier frequency components.

23. The computer-readable medium according to claim 21, wherein the sub-step of detecting a plurality of events includes:
keeping the first running average over the first averaging period of the plurality of time dependent frequency components so as to obtain a first series of averages for the first averaging period;
keeping the second running average over the second averaging period of the plurality of time dependent frequency components so as to obtain a second series of averages for the first averaging period; and
recording a plurality of event times, each of the event times being a time at which there occurs one of the detected events of the first running average crossing the second running average.

24. The computer-readable medium according to claim 14, wherein the generating step further includes the sub-steps of:
performing a Fourier transformation of the audio content into a time series of audio power dissipated over a first plurality of frequencies;
grouping the frequencies into a smaller second plurality of bands that each include a range of neighboring frequencies;
detecting power dissipation events in each of the bands; and
grouping together the power dissipation events from mutually adjacent bands at a selected moment so as to form an identifying feature.

25. A system for monitoring audio content in a video broadcast, said system comprising:
a receiver for receiving an audio datastream from the video broadcast;
an identifying information generator for generating audio identifying information based on detected events in audio content from the audio datastream; and
a match detector for determining whether the audio identifying information generated for the received audio content matches audio identifying information in an audio content database,
wherein the identifying information generator detects a plurality of events in the audio content, each of the events being a crossing of the value of a first running average and the value of a second running average,
the first running average is an average over a first averaging period of a plurality of time dependent frequency components of the audio content, and
the second running average is an average over a second averaging period, which is different than the first averaging period of the time dependent frequency components of the audio content.

26. The system according to claim 25, wherein the audio identifying information is an audio feature signature that is based on the detected events in the audio content.

27. The system according to claim 25, wherein the audio content database stores audio identifying information for predetermined audio content.

28. The system according to claim 25, further comprising:
an invoicer for determining a duration of the audio content in the video broadcast and charging a royalty based on the duration, if the audio identifying information generated for the received audio content matches audio identifying information in the audio content database.

29. The system according to claim 25, further comprising:
an information collector for recording information on a match between the received audio content and the audio content database, if the audio identifying information generated for the received audio content matches audio identifying information in the audio content database;
a cue sheet generator for compiling cue sheet entries from the recorded match information, the cue sheet entries including identification of at least one piece of audio content in the video broadcast, a start time of each piece of audio content, and a duration of each piece of audio content; and
an invoicer for charging royalties based on the cue sheet entries.

30. The system according to claim 25, further comprising:
an information collector for recording information on a match between the received audio content and the audio content database, if the audio identifying information generated for the received audio content matches audio identifying information in the audio content database;

a cue sheet generator for compiling cue sheet entries from the recorded match information, the cue sheet entries including identification of each piece of audio content in the video broadcast, a start time of each piece of audio content, and a duration of each piece of audio content; and a royalty calculator for calculating royalties to be paid based on the cue sheet entries.

* * * * *